June 5, 1962 R. S. WILLIAMS 3,037,585
ADJUSTABLE HERMETICALLY SEALED DAMPING DEVICES
Filed April 22, 1959

Ray S. Williams
INVENTOR.
BY Gerald B. Tjoflat
His Attorney

_United States Patent Office_

3,037,585
Patented June 5, 1962

3,037,585
ADJUSTABLE HERMETICALLY SEALED DAMPING DEVICES
Ray S. Williams, Orrville, Ohio, assignor to Hagan Chemicals & Controls, Inc., Pittsburgh, Pa., a corporation of Pennsylvania
Filed Apr. 22, 1959, Ser. No. 808,251
4 Claims. (Cl. 188—94)

This invention relates to damping devices.

In certain types of pneumatic relays, totalizers and similar devices embodying springs, diaphragms and valves for controlling the transmission of output pressures utilized for control or regulating purposes, which output pressures may also be utilized to load one or more of the diaphragms of the devices, there are strong tendencies for vibrations to develop in the valve-spring-diaphragm systems. Such vibrations interfere with the operation of the valves and the accuracy of their performance.

Satisfactory damping of these devices has long been a problem. Oil dash pots, comprising cup and pistons, have been utilized with satisfactory results in certain cases. However, since the oil dash pot dampers can be mounted in a fixed position only, otherwise the oil will spill out, devices to which they have been applied had to be mounted in a fixed position also.

When devices damped with oil dash pots were used on shipboard for example, the rocking and rolling of the ships was often so great as to spill the oil out of them. Such occurrences rendered the dash pots useless, and also produced fire hazards.

Furthermore, damping devices as heretofore constructed for application to devices of the type under consideration, were fixed in their damping characteristics because of a lack of suitable means for adjusting them.

An object of this invention is to provide a viscous damping device from which the damping liquid cannot be spilled regardless of the position in which it is placed and which will perform its intended function in all possible positions the device damped thereby might assume.

Another object is to provide a damper in which the damping liquid is sealed in a liquid-tight container, and that comprises a minimum number of parts, is easily manufactured and assembled and relatively inexpensive.

A further object is to provide a damping device comprising an outer flexible member composed of an elastomer and spaced, rigid members disposed within the same and secured to opposite walls of the flexible member, whereby relative motion of the rigid members causes liquid to be displaced from between them or drawn into the space between them as they separate, thereby producing a damping force. The term elastomer includes natural rubber and synthetics having characteristics similar to that of rubber.

A still further object is to provide a damping device as set forth in the next preceding object, which is so constructed that the rigid members within the flexible member may be adjusted when mounted in place on a device to be damped, so as to either increase or decrease the spacing of those members, according to the damping characteristics to be exhibited by the damper.

The above and other objects of the invention will be apparent to those of ordinary skill in the art to which the invention pertains from the following description and the accompanying drawings.

Figure 1:
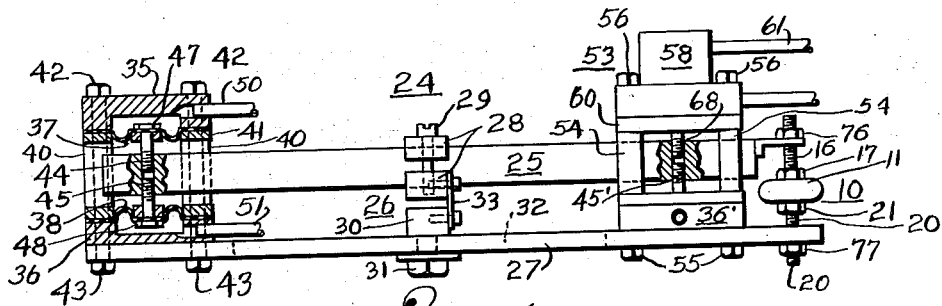
FIGURE 1 is a more or less diagrammatic view of a pneumatic totalizer having a fulcrumed beam and a damping device therefor embodying a form of the invention.
Figure 2:
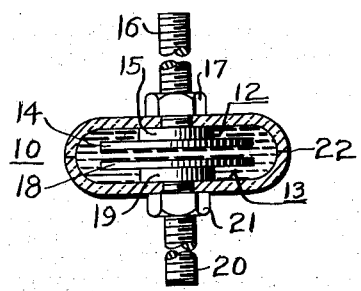
FIG. 2 is a view in section of the damping device.

In the drawings a damping device 10, embodying what now appears to be a preferred form of the invention, is illustrated. It comprises an hermetically sealed, hollow, flexible member 11 having therein spaced, rigid members 12 and 13 secured to opposed walls thereof.

Member 12 includes a disc portion 14 having a boss 15 engaging the inner surface of the upper wall of member 11, and from which a threaded shank 16 extends upwardly. A nut 17 threaded on the shank 16 is provided to clamp the upper wall of member 11 tightly between the boss and the nut so as to provide a fluid-tight joint at the point where the shank passes through the same.

Member 13 comprises a disc portion 18 having an extending boss 19 engaging the inner surface of the bottom wall of member 11 and from which a threaded shank 20 extends downwardly. The shank 20 passes through the bottom wall of member 11 at a location directly opposite the point where the shank 16 passes through its upper wall.

A nut 21 is threaded on the shank 20 in order to clamp the wall of member 11 tightly between the boss 19 and the nut to provide a fluid-tight joint.

Figure 3:
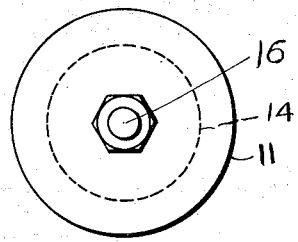
FIG. 3 is a plan-view of the damping device.

In a preferred form of the invention, the disc portions 14 and 18 are circular or substantially so, as indicated in FIG. 3. The flexible member 11 may be made in two parts and, after the members 12 and 13 have been mounted to the respective parts, those parts are joined by sealing them at the parting line, the parting line being indicated at 22.

After the members 12 and 13 have been mounted as shown, and the member 11 has been sealed at the parting line 22, it is filled with liquid having a viscosity sufficient for the purpose. Air is not operative as a viscous medium and produces no damping effect. A suitable viscous liquid may be a silicone oil, for example. The device 11 is filled so completely as to remove all air bubbles from within the same. This may be accomplished by loosening one or the other of the nuts 17 or 21 during the process of filling. The filling may be accomplished by placing the member 11 in a jig or fixture designed to compress it slightly but firmly towards the center thereof while the nut 17, for example, is loosened. The fluid is then injected at a pressure sufficient to completely fill member 11 and scavenge the air from the same. Having been filled, the nuts are then tightened securily.

A practical application of the damping device is shown in FIGURE 1 where it is embodied in a pneumatic totalizer 24. Totalizer 24 comprises a beam 25 mounted on a fulcrum 26 which is secured to a rigid frame member 27. The fulcrum 26, as illustrated, comprises split clamp blocks 28 that partially embrace the beam and which are secured in clamping relation to the beam by means of screws 29. The fulcrum also includes a base or support block 30 which is adjustably secured thereto by means of a clamp screw or bolt 31. The bolt 31 extends through a slot 32 in the base so that the fulcrum may be moved either right or left to adjust the lever arms of the beam.

The clamp blocks 28 and the block 30 are joined by a flexible fulcrumed leaf spring 33. The location of the spring 33 determines the effective location of the fulcrum and is the point about which the beam 25 rocks.

Device 24 includes pressure receiving bonnets or housings 35 and 36 disposed on opposite sides of the beam 25 but on the same side of the fulcrum 33. These bonnets or housings are provided with diaphragms 37 and 38, respectively. The bonnet 36, as shown, rests on the base 27. The marginal edge of diaphragm 38 is clamped between the bonnet and a clamp ring 39. Extending upwardly from the clamp ring 39 are spacers 40 which support a clamp ring 41 at their upper ends. The marginal edge of the diaphragm 37 is clamped between the ring 41 and the open face of the bonnet 35. The bonnets and the clamp rings are rigidly secured to the base 27 by means of cap screws 42 and 43 threaded into the spacers 40.

The central portions of the diaphragms 37 and 38 are connected to the beam 25 by means of screws 44 and 45. These screws have relatively large heads, as shown, so that the central portions of the diaphragms may be clamped between these heads and nuts 47 and 48 threaded on the screws.

At the opposite side of the fulcrum 26, the device 24 is provided with a pressure receiving unit similar to that comprised by the bonnet 36 and the diaphragm 38. Since it is similarly constructed, similar and corresponding parts are identified by the same reference characters with primes affixed.

Signal pressures may be supplied to the bonnets 35 and 36 through signal pipes 50 and 51.

The device 24 also includes a diaphragm-operated valve assembly 53.

The pressure receiving unit, identified by the bonnet 36', is shown as resting on the base 27, and the diaphragm valve assembly 53 as resting on spacers 54. The assembly 53 and the bonnet 36' are rigidly secured together and to the spacers and the base 37 by means of screws 55 and 56.

Figure 4:
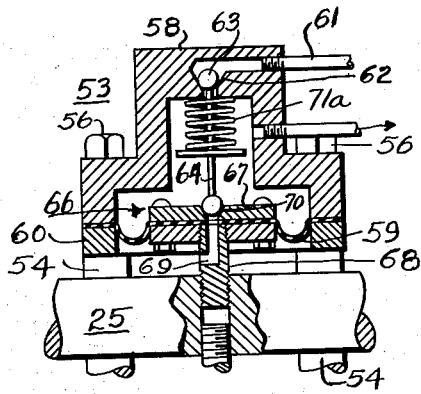
FIG. 4 is a view in section of a diaphragm-operated valve embodied in the device of FIG. 1.

The diaphragm valve assembly 53 is shown more or less schematically in FIGURE 4. It comprises a bonnet 58 having a diaphragm 59 extending across its open end. The diaphragm is clamped between the bonnet 58 and a clamp ring 60. The bonnet 58 is provided with a supply pipe 61 to which a supply of pressure medium, such as compressed air at constant pressure, may be supplied from a source not shown. The bonnet includes an inlet valve port 62 controlled by a valve 63 carried at the upper end of stem 64. The central portion of diaphragm 59 is provided with an exhaust valve assembly 66. That assembly includes a bolt or the like having a large head 67 and a hollow threaded shank 68, the lower end of which is threaded into beam 25. The shank 68 has a side port 69 communicating the interior of the shank 68 with the atmosphere. The head 67 is formed with an exhaust port seat 70 that communicates the chamber 71 of the bonnet 58 with the atmosphere.

A light compression spring 71a, supported between the roof of the bonnet 58 and a collar 72 fastened to the steam 64, may be provided to bias the valve 63 towards seated position on the inlet port seat 62.

If a pressure is supplied to the bonnet 35 while maintaining the pressure in the bonnet 36 at atmospheric, the beam 25 will rock in a counterclockwise direction causing the valve 63 to unseat and admit pressure into the chamber of bonnet 58. That pressure develops a force on the diaphragm 59 proportional to the pressure and its area, and when it balances the force of the pressure on diaphragm 37, which again is proportional to the pressure and the area of the diaphragm, the beam 25 will come to its neutral position. In that position, the inlet port seat 62 and the exhaust port seat 70 are closed.

If a pressure is admitted also to bonnet 36, the beam 25 will rock clockwise or counterclockwise, according to the difference between the pressures in the bonnets 35 and 36. Pressure in the bonnet 36 exerts a force on the beam 25 tending to turn it clockwise. Thus, the forces developed by diaphragm 38 produce clockwise turning moments on beam 25 the same as the diaphragm 59 of the assembly 53. Forces developed by diaphragm 38', develop turning moments which are in the same direction as those developed by diaphragm 37, namely counterclockwise.

The damping device 10, as shown in FIG. 1, is connected to the base 27 and to the beam 25. The stem 16 passes through a flange secured to the end of the beam, while the stem 20 passes through the base 27. By utilizing nuts 76 and 77, the spacing between the discs 14 and 18 may be adjusted in accordance with the damping action required.

The totalizer shown in FIG. 1, as above stated, is essentially a neutral position device. In other words, it is in balance when both the exhaust port 70 and the inlet port 62 are closed. If unbalance arises because of preponderant clockwise or counterclockwise turning forces on the beam, the pressure in the chamber of bonnet 58 will be readjusted until the beam has come to its neutral position. When the forces on beam 25 tending to turn it clockwise preponderate, the exhaust port seat 70 is uncovered so as to reduce the pressure in the chamber of bonnet 58. If the forces are in the opposite direction, the pressure is increased.

As stated supra, a device embodying a system of diaphragms and springs, and in which the diaphragms are subjected to varying pressures, may at various operating pressures develop vibrations which, if not damped, would render the pressures developed by the valve assembly 53 so erratic as render the device as a while quite useless. The particular pressure at which the vibration develops is dependent upon the thickness and stiffness of the diaphragms, the stiffness and length of the springs and other causes. Since the damping device 10 acts on the beam 25, which is movable relative to the fixed end of the damping device, that end being attached to the base 27, the discs 14 and 18 will move towards or away from each other thereby displacing liquid either from between the discs or into the space between them. The liquid is displaced from between the discs when they approach each other, the liquid being transferred into the space as they separate.

The damping device 10 is one which can be mounted in any position because the damping liquid cannot escape or be spilled out. Therefore, the device of FIG. 1 may be mounted in a horizontal position in a vertical position or at any angular position between horizontal and vertical, without spilling liquid from the device. The damping device therefore overcomes the objections stated supra. Furthermore, as it is adjustable, as above described, the damping characteristics required for a particular device to be damped, may be adjusted to suit that particular device.

Having thus described the invention, it will be apparent to those of ordinary skill in the art to which the invention pertains, that various modifications and changes may be made in the illustrated embodiment without departing from either the spirit or the scope thereof.

Therefore, what is claimed as new and desired to be secured by Letters Patent is:

1. A viscous damping device adapted to be attached to a movable member subjected to vibration and to a member that is stationary, said damping device comprising an hermetically sealed, hollow flexible member having independently movable disc members disposed within and spaced from said hollow flexible member and secured to opposite walls thereof, each of said disc members being provided with a shank extending outwardly of the hollow member and provided with means whereby one of them may be secured to said vibratable member and the other to the member wihch is stationary, and a viscous liquid filling said hollow flexible member and enveloping said disc members.

2. A device as in claim 1 in which the shanks are provided with means whereby they may be adjustably attached to the movable and stationary members, whereby the disc members may be adjusted towards or away from each other to modify the damping characteristics of the device.

3. A device as in claim 1 in which the disc members are substantially circular.

4. A device as in claim 1 in which the flexible member is composed of an elastomer and the damping liquid comprises a silicone oil.

References Cited in the file of this patent

UNITED STATES PATENTS

| | | |
|---|---|---|
| 1,007,386 | Polk | Oct. 31, 1911 |
| 1,304,311 | Heldrich | May 20, 1919 |
| 1,671,764 | Dickey | May 29, 1928 |
| 2,437,037 | Nelson et al. | Mar. 2, 1948 |
| 2,698,404 | Edwards | Dec. 28, 1954 |
| 2,747,386 | Ayling | May 29, 1956 |
| 2,756,016 | Painter | July 24, 1956 |
| 2,775,317 | Sinisterra | Dec. 25, 1956 |
| 2,919,883 | Murphy | Jan. 5, 1960 |
| 2,929,231 | Bank | Mar. 22, 1960 |
| 2,930,455 | Williams | Mar. 29, 1960 |
| 2,965,349 | Hutton | Dec. 20, 1960 |
| 2,969,656 | Reuter | Jan. 31, 1961 |

OTHER REFERENCES

Product Engineering Publication, October 1953, pages 142–143.